Nov. 17, 1925.
J. G. COFFIN
1,561,970
TESTING MACHINE
Filed Sept. 1, 1922 4 Sheets-Sheet 1
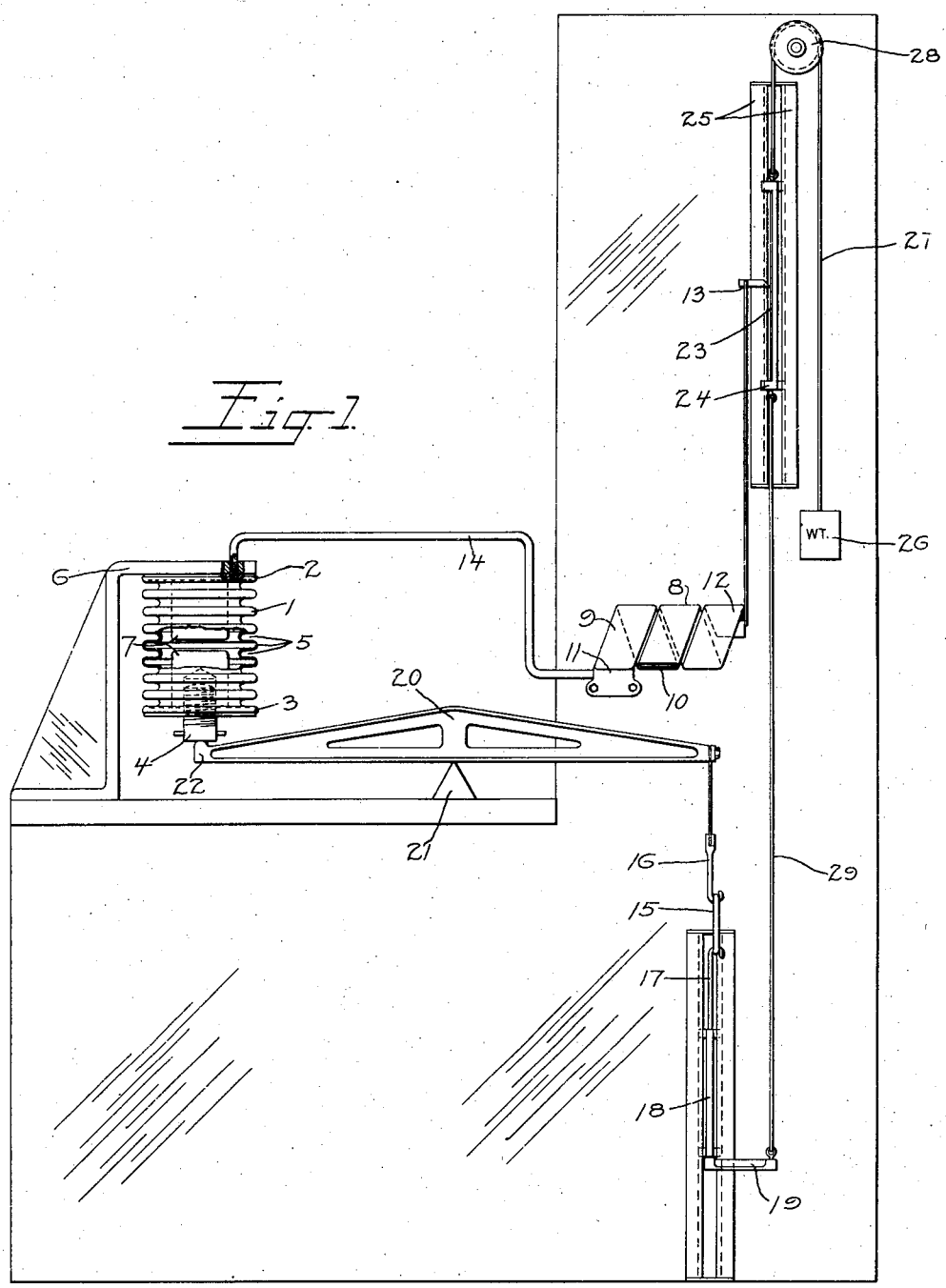
Inventor
JOSEPH G. COFFIN.
By his Attorney
Ernest Hopkinson Nov. 17, 1925.

J. G. COFFIN 1,561,970

TESTING MACHINE

Filed Sept. 1, 1922    4 Sheets-Sheet 2

Inventor,
JOSEPH G. COFFIN.

By his Attorney
Ernest Hopkinson

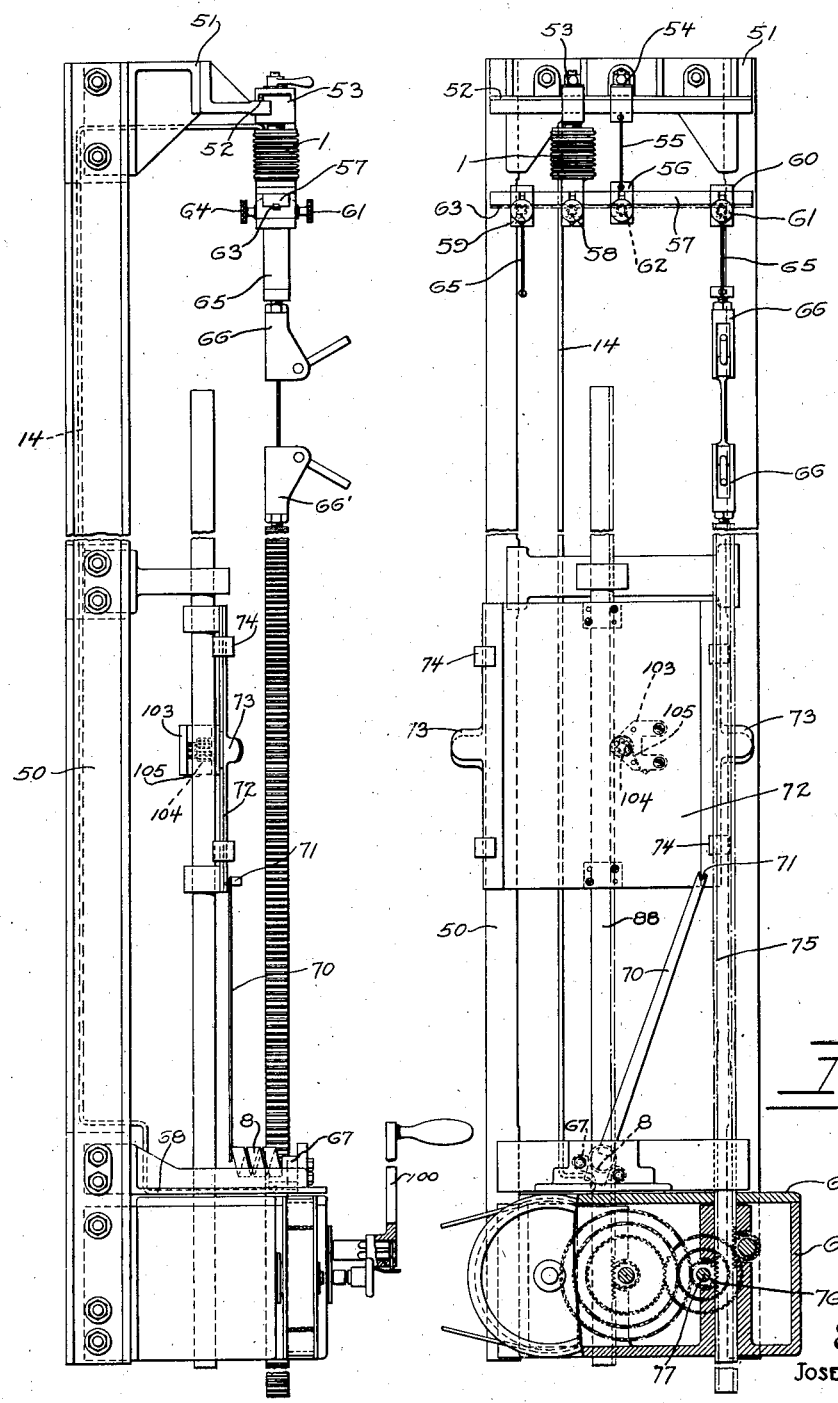

Nov. 17, 1925.

J. G. COFFIN 1,561,970

TESTING MACHINE

Filed Sept. 1, 1922 4 Sheets-Sheet 4

Inventor,
JOSEPH G. COFFIN.

By his Attorney
Ernest Hopkinson

Patented Nov. 17, 1925.

1,561,970

UNITED STATES PATENT OFFICE.

JOSEPH G. COFFIN, OF HEMPSTEAD, NEW YORK, ASSIGNOR TO MORGAN & WRIGHT, OF DETROIT, MICHIGAN, A CORPORATION OF MICHIGAN.

TESTING MACHINE.

Application filed September 1, 1922. Serial No. 585,612.

*To all whom it may concern:*

Be it known that I, JOSEPH G. COFFIN, a citizen of the United States, and residing at Hempstead, Long Island, county of Nassau, and State of New York, have invented certain new and useful Improvements in Testing Machines, of which the following is a full, clear, and exact description.

This invention relates to measuring or testing machines and more particularly to a closed hydraulic elastic system in which the pressures developed by an applied force are converted into motion of a pointer or equivalent device for reading or recording the stresses applied to a specimen.

Heretofore, so far as I am aware, testing machines have utilized mechanical instrumentalities between an applied force and a gage or indicating mechanism to enable the applied stresses to be read or recorded. Generally, these old types of appliances employed in mechanical arts to transmit the forces to the indicating end or gage are expensive, introduce friction, or other sources of error, are liable to get out of order, and are slow, taking more time to operate than is necessary. Hydraulic systems have been proposed but in a form open to one or more serious objections preventing general adoption.

The present invention is radically different and aims to provide between the applied force and an indicator or scale, a closed elastic hydraulic system instantly responsive to the application of a force, which is without friction, which multiplies small and invisible motion many times—rendering it measurable and recordable—which requires no external springs—the restoring force being in the elastic structure of a device constituting part of the system, at least to all practical purposes, and which obeys Hooke's law exactly within the designed capacity of a given construction. The hydraulic system is the essence of simplicity, extremely sensitive and accurate, foolproof, may be operated by even the most ignorant, and generally appears to be a long sought desideratum.

With the illustrated embodiments in mind and without intention to limit more than is required by the prior art, the invention may be said to consist primarily in a collapsible container offering no error-introducing resistance to attempted change of its volumetric capacity and introducing no error by the negligible change thereof that may occur, in combination with a conduit extending from the container any distance—great or small—to a curled or longitudinally bent tube, preferably of the well-known Bourdon gage type having one end anchored and the other end free to move. A pointer, hand, mirror, or other suitable device, may be attached to the free end of the curled tube for indicating on a dial, or recording on a chart, the deflection of the free end of the tube. The free end of the tube is moved or deflected in direct proportion to the change in the pressure within the system, which change results from the application of a force or stress to the cushioned or shiftable end or wall portion of the collapsible container.

The invention is illustrated diagrammatically in its particular application to a form of machine suitable for testing specimens of rubber, permitting determination of the qualities thereof adiabatically as well as isothermally, but it is not confined to such an application, being useful for seismographs, weighing machines, wherein it would effect great commercial saving, and impact testing machines, such as for ascertaining the blows of a vehicle on a road-bed. These and other applications of the invention are obvious, and all uses are comprehended which employ the underlying principles thereof.

Embodiments of the invention are illustrated in the accompanying drawings in which:—

Fig. 1 is a diagrammatic elevation of a machine suitable for testing rubber specimens;

Figs. 7 and 8 are front and side elevations, respectively, the former partly in section, of a commercial form of the apparatus suitable for testing;

Figures 9, 9A, 10:
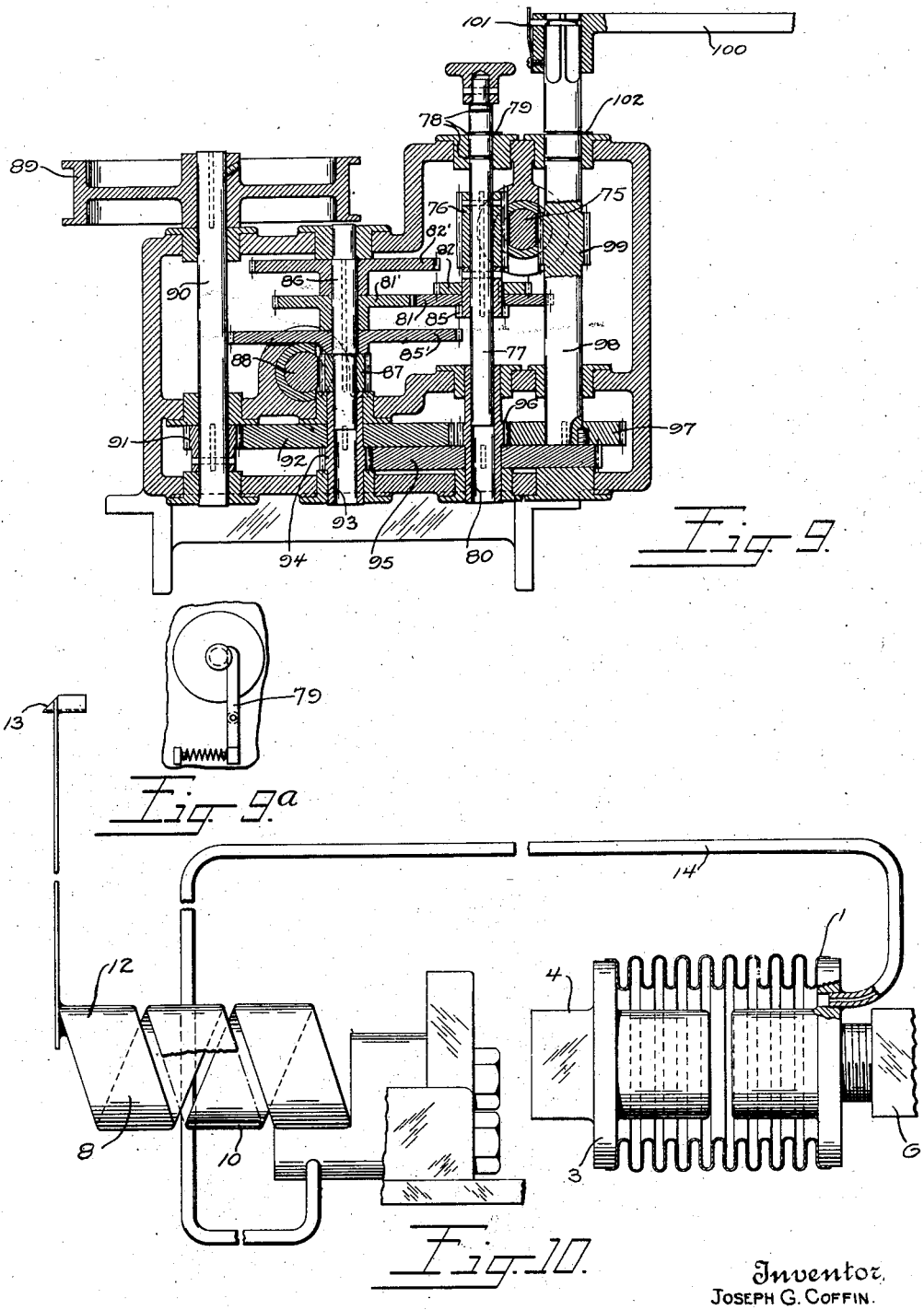
Fig. 9 is a horizontal section through the gear housing shown at the base of Figure 7.

Fig. 9ª is a detail;

And Fig. 10 is an enlarged diagrammatic plan view of the closed hydraulic system, the sylphon appearing in cross-section to better illustrate its construction.

As the invention is capable of wide and varied application, the basic parts thereof will first be described in detail and in their preferred form. This is illustrated in Fig. 1, in which is shown a readily compressible container, indicated generally at 1, having rigid ends 2 and 3, the latter of which is free and preferably accessible for the application of force through a lever or directly to the abutment or surface 4. The sides of the container, as shown, are corrugated, as indicated at 5, to permit of collapsing and thereby changing its volumetric capacity with no error introducing resistance. The material may be copper, phosphor bronze, or in fact any material of a high or low resiliency that will permit the container to yield readily when force is applied to a portion of the walls of the container. I prefer to employ copper, however, as that may be manufactured in the crimped or bellows form illustrated in one piece and circular in cross-section. But the form of the container may be varied, a hollow oblate spheroid, for instance, might be employed for some purposes, if the range of test pressures is small, without substantial error, or if the range of forces applied to test the specimens be great, correction could be made by suitably calibrating the scale or record sheet.

One end of the container 1 is preferably fixed to, or arranged to react against a rigid immovable support, such as indicated at 6. To limit the extent of collapse of the container, plugs 7 may be located internally so as to abut one against the other. Their use, however, is entirely optional, merely rendering the apparatus safe against the development of a disruptive pressure within the closed hydraulic system.

The second element of the system is indicated generally at 8. It comprises essentially a longitudinally bent tube 9, preferably flattened in cross-section, as indicated at 10, having one extremity 11 that is adapted to be anchored or secured in any suitable manner to some convenient fixed part and having its other extremity 12 free to move with changes in the fluid pressure in the tube. To the free extremity 12 of the tube, a pointer, mirror, or a scriber, such as indicated at 13, may be attached for indicating or recording by its deflection force applied to the system.

Connecting the container 1 and the tube 8 is the third element of the system, a hollow conduit 14, preferably of copper, but any other suitable material which is not expanded by the pressures to which the system is subjected, may be employed. The conduit 14 establishes communication between the hollow bent tube 8 and container 1. It will be understood, of course, that a liquid, such as alcohol, oil, or water, completely fills the container 1, conduit 14 and longitudinally curved tube 8, and that the conduit 14 may be as long or as short as desired.

When a force is applied to the accessible abutment, pressure is immediately developed within the liquid filling the system exactly proportional to the force, the area of liquid effectively resisting the same being constant regardless of any displacement of the end wall of the container. The liquid is incompressible, the conduit 14 is non-expansible, and the helically coiled tube 8 is the only thing that opposes inward (or outward) displacement of the end 3 of the container. This tube 8, however, offers a comparatively high resistance to increase in its volumetric capacity. Upon increase of pressure within the system, the free end 12 of the tube moves or is deflected. It is believed that this is due to two things:—first, the tendency of the longitudinally bent tube to become straight, and second, the tendency of the tube, which is flat in cross-section, to become round. The latter, of course, augments the former. Which of these tendencies of the tube dominates is not known, and, so far as the invention is concerned, does not seem to be important, for either or both may be present and utilized. Whatever may be the explanation, an application of say 50 lbs. to the end wall 3 of a container 1—whose area in cross-section is, for instance, 2 sq. ins., and which consequently develops a pressure within the system of 25 lbs. per sq. in.—produces a full scale deflection of the pointer 13, the free end 12 of the tube moving about ⅜ or ½ of an inch. In this example, the application of 50 lbs. pressure to the end 3 produces no visible, or a negligible, movement thereof and consequently, the volumetric change in the tube 8 is very small despite the appreciable movement of the free end 12 of the curled tube. Instantly the pressure is removed from the end 3 of the container 1, the pointer 13 on the free end 12 moves back to its starting position. The restoring force is primarily, and practically entirely, that inherent in the elastic structure of the Bourdon tube 8. The volumetric decrease in the container 1 and increase in the tube 8, in this illustration case, are not more than a few drops of the liquid and the displacement of the abutment 4 is only a few thousandths of an inch. It will be understood in the foregoing that reference is made to a particular size of container and Bourdon tube and that the figures are given merely for the purpose of making the disclosure clear and definite, and are not to be taken in any way as limitations of the principles underlying the invention.

The foregoing relates to the vital construction or features of the invention. The closed elastic and frictionless hydraulic system constituted by the container 1, coiled tube 8, and conduit 14, may be employed in a number of different types of testing machines.

In Fig. 1 of the drawings, the system is shown diagrammatically as it may be employed in an elemental form for testing rubber. A specimen 15 of rubber, for instance, may be positioned between two jaws 16 and 17 to the latter of which a pull may be applied through a slidable rod 18 and handle 19, and thereby the rubber specimen 15 stretched with a force which is measured through the upper jaw 16. For this measuring, the upper jaw 16 may be connected to one end of a lever 20 fulcrumed at 21, whose opposite end 22 is adapted to press against the abutment 4 and thereby raise the pressure within the fluid system to a degree depending upon the effective internal cross-section of the container 1 and the location of the fulcrum 21 with respect to the ends of the lever 20.

In the plane of movement of the free end of the marker 13, is located a chart 23 suitably mounted in a frame 24 reciprocable in guideways 25 and substantially balanced with a counterweight 26 connected thereto by a cord 27 which passes over a pulley 28. To the lower end of the frame 24 is connected an inextensible cord or wire 29 which is secured to the pull arm 19 by which the specimen of rubber is adapted to be stretched.

In operation, when the specimen 15 is stretched by a force applied thereto through the arm 19, the chart 23 is displaced in one direction exactly as much as the specimen is stretched while simultaneously through the fluid system 1—14—8, the marker 13 is swiped across the chart at a substantial angle. The apparatus above described is exceedingly simple and accurate, enables the hysteresis of rubber compounds to be determined accurately and either adiabatically or isothermally, the former being possible because of the instantaneous responsiveness of the fluid pressure system. Notwithstanding the employment of ductile and relatively inelastic metals, such as copper or brass, for the container 1 and coil 8—these materials being preferable for manufacture, but others may be employed—all parts of the apparatus are well within their elastic limits and consequently, obey Hooke's law. The deflections of the marker 13 are exactly proportional to the stresses applied to the specimen 15. By shifting the position of the fulcrum 21 so as to vary the leverage, by employing a container—or sylphon, as it is known on the market—of a suitable size in cross-section and by utilizing a longitudinally curved tube 9, offering greater or lesser resistance to an internally applied pressure, the apparatus may be adapted to handle or test a wide variety of substances, if not any and all materials.

Figure 2:
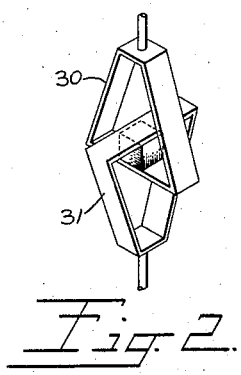
Fig. 2 shows stirrups for use in the machine of Fig. 1, facilitating compression tests.

For testing rubber in compression, the jaws 16 and 17 of Fig. 1 may be replaced by stirrups 30 and 31, Fig. 2.

Figure 3:
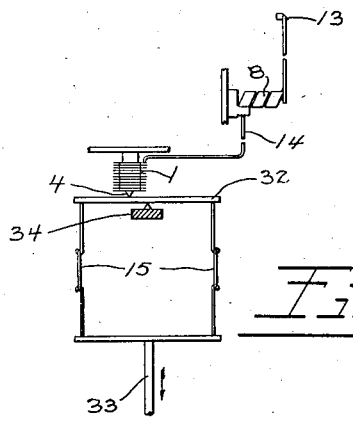
Fig. 3 shows a method of testing specimens in parallel.

In Fig. 3 of the drawings is illustrated another method of testing rubber specimens 15. In this, the specimens are arranged parallel and are connected to the opposite ends of a lever 32 and pull-rod 33. If the specimens are of identical cross-section, the lever 32 may be fulcrumed at 34 midway its effective length. If the specimens differ in thickness or gage, the arms of the lever may be varied in length to compensate therefor. In either case, however, differences in the properties of the specimens only are indicated or recorded, the extent of displacement of the pointer 13 being made anything desired by locating the extremity 4 of the container or sylphon 1 a greater or lesser distance from the fulcrum 34. This parallel arrangement for testing rubber is highly desirable for some purposes as specimens are usually stamped out with a die so that they are of the same dimensions in one plane, but frequently vary in gage or thickness at right angles to said plane. This parallel arrangement permits of taking at one and the same time, a tension and compression test. It allows also of a great increase in sensitiveness as differences in the specimens only are indicated and as the amplitude or displacement of the pointer 13 may be multiplied as desired by merely shifting the end 4 of the sylphon away from the fulcrum. Of course, the container or sylphon 1 is connected up to a Bourdon tube 8, in this application of the invention, as has already been described in detail.

Figure 4:
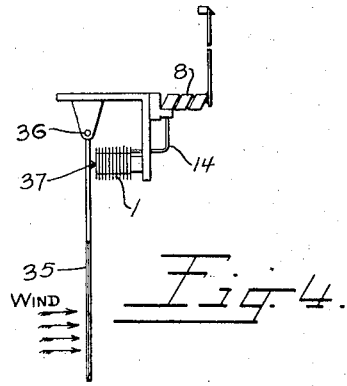
Fig. 4 shows the application of the invention to an air speed meter.

In Fig. 4 of the drawings, the closed elastic frictionless hydraulic system is shown diagrammatically as it may be utilized in an air speed meter for airplanes or observation purposes. As therein illustrated, it comprises a vane or extensive surface 35 on an arm which is hinged at 36 and adapted intermediately, as at 37, to apply a force to the shiftable end of the collapsible container 1 forming part of the hydraulic system 1—14—8, and thereby develop a pressure within the same.

Figure 5:
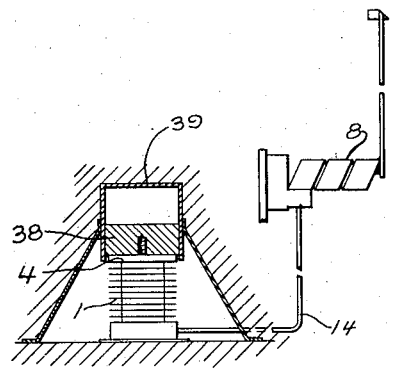
Fig. 5 illustrates conventionally a seismograph utilizing the closed hydraulic system of the present invention.

Fig. 5 of the drawings illustrate still another application of the invention in which the closed hydraulic system 1—14—8 has its freely movable extremity 4 loaded with a dead weight 38 freely responsive to shocks but dampened against minor vibrations by frictionless confinement in a housing or stuffing box 39. In this form, it constitutes a seismograph for recording shocks either within the surface of the earth or on a travelling vehicle or for recording stresses produced by changes in the direction of travel of an airplane.

Figure 6:
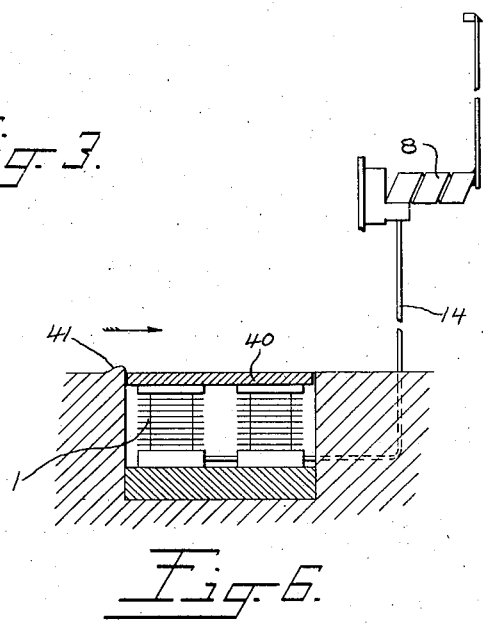
Fig. 6 shows an impact testing apparatus suitable for mounting in a road-bed to enable the shock of a vehicle and its rebound to be recorded.

An impact testing machine, illustrated in Fig. 6 of the drawings, is still another form in which the invention may be utilized with advantage. Heretofore, shocks on a road from a travelling vehicle have been ascertained by computation from the extent of compression of a copper cylinder. With my invention, a suitable number of sylphons 1, preferably three or more, may be imbedded in a roadway and covered with a plate or platform 40 upon which a vehicle may be dropped from a suitable height, as indicated at 41, while passing along a road in the direction of the arrow. The several sylphons are in communication with one another and with a conduit 14 connected up to a hollow coil 8 of the previously described construction and located off to one side out of the way of the vehicle. While only one sylphon may be employed, a number of them are preferred in order to stand a force of many thousand pounds.

If not already understood, it is to be noted that the sylphons or container elements of the closed hydraulic systems may be made of double or triple wall thickness to withstand a high pressure, of say 100 lbs. per square inch, and of almost any diameter, each having a large effective area, of say about 100 square inches. A gage or coil tube 8 of the previously indicated capacity placed in communication with such a large single sylphon would have a full scale deflection when a force of 10,000 lbs. is applied to the shiftable or impact end of the container.

In Figs. 7, 8 and 9 of the drawings is illustrated a commercial form of machine for testing rubber. In Fig. 10, the container and the longitudinally bent tube, or Bourdon gage, are shown about the actual size suited for testing specimens of rubber. The principles of operation of this commercial machine are substantially the same as those previously mentioned in connection with the description of the machine diagrammatically illustrated in Fig. 1 of the drawings. This commercial form of machine of Figs. 7-10, inclusive, will therefore now be described primarily to disclose its details of construction and certain practical advantages of the closed hydraulic system will be emphasized.

Referring to Figs. 7-10 of the drawings, the commercial machine is shown as comprising an upright frame 50, at the top of which is an overhanging bracket 51, fashioned at its front with a substantially longitudinal rib 52. To the rib 52 and forward edge of the bracket 51 are secured, by saddle-clamps 53 and 54, the sylphon 1 and a steel suspension strip 55. The latter, at its lower end, is connected to a slide 56 which is constructed to embrace and support the lever 57. The lower end of the sylphon is connected to a slide 58. And slides 59 and 60 are also mounted on the lever 57. Each of the slides 56, 58, 59 and 60, is preferably provided with a thumb-screw 61 for turning a pinion 62 journalled therein, the pinion 62 being adapted to engage a rack 63 rigid with the lever 57. By turning the thumb-screw 61, the several slides may be adjusted lengthwise of the lever. A locking nut 64 is also provided on each of the slides to secure them in an adjusted position. Inextensible strips or bars 65 depend from each of the slides 59 and 60, and to the lower end of each of these, gripping jaws or specimen holders 66, of any suitable form, may be attached to carry the load applied to a specimen to the lever 57. Only one jaw is shown as the other is used for a special purpose to be described later.

The incompressibility of the fluid in the hydraulic system, of which the sylphon 1 is a part, permitting no—or a negligible—motion of the lever 57 in operation, the lower end of the sylphon 1 may be positively connected to the slide 58, which I prefer to do. The lower end of the sylphon 1 may, however, be placed in abutting relation, and not connected, with the lever 57. The sylphon 1 is connected by a conduit 14 with a Bourdon gage 8, or other form of element made highly resistant to change in its volumetric capacity that may be employed. The gage 8 is shown secured by brackets 67 to the top 68 of a housing 69 at the bottom of and rigid with the frame 50. One end of the coil tube 8 is anchored and the other end free. The free end carries a light flexible strip 70, terminating in a marker 71, which is adapted to be moved approximately in the arc of a circle in a direction more or less horizontal. Beneath the marker 71 is located a record carrier 72, preferably in the form of a board, with pinch-clamps 73 at its margins for ready mounting of a record sheet, spring clips 74 normally maintaining the grip of the clamps on a sheet of co-ordinate paper.

The record carrier 72 may be connected positively with the lower specimen gripper 66' so as to be moved exactly to the same extent as the specimen is deformed—that is, elongated or shortened—but I prefer to provide a means permitting a 1:1, 1:2, or 1:5, movement of the lower jaw 66' relative to the record carrier 72. To this end, the pull-rod 75, which is directly connected to the lower jaw 66' and by which the specimen is stressed, is provided on one side with a rack engaging a pinion 76 keyed to a shaft 77. The shaft 77 may be rotated and also shifted endwise, being provided at one end with a series of grooves 78 for the reception of a spring-pressed detent 79, see Fig. 9ª, holding it against endwise movement in any one of three positions determined by the location of the grooves. The opposite end of the shaft 77 is journalled in a sleeve 80 which is suitably bushed in portions of the housing 69. Keyed on the shaft 77 are three different sized pinions 81, 82 and 85, which co-operate with gears 81', 82' and 85' on a shaft 86, carrying a pinion 87 engaging a second rack-bar 88 parallel to the pull-rack 75. The rack-bar 88 is connected to the record carrier 72. By suitable selection of the gears 81—82—83 to intermesh with one of the primed set, the record carrier 72 may be moved to the same extent, or half or one-fifth the extent, the specimen is deformed by a stress applied to it through the rack-bar 75.

Stress may be applied to the specimen through the lower jaw 66' either by power or by hand. For power operation of the machine, a belt is appplied to a pulley 89 on a stub-shaft 90, which is parallel to the shafts 86 and 77. By pinion 91 keyed to shaft 90, the power may be transmitted through a gear 92, which is rigid with a sleeve 93 fashioned intermediately with a pinion 94, to a gear 95 that is keyed to the before-mentioned sleeve 80. The sleeve 80 is fashioned intermediately to form a pinion 96 engaging a gear 97 on a fourth shaft 98 having a pinion portion 99 engaging a second rack formed on the pull-bar 75. Thus, by power, the pull-rack 75 may be actuated to stress a specimen and by suitable endwise adjustment of the shaft 77 made to simultaneously move the record carrier 72 to the desired extent in proportion to the deformation of the specimen.

For accomplishing the same end manually by power, the shaft 98 may be shifted endwise so as to disengage its gear 97 from the power train and allow of its independent rotation by a hand-crank 100, which is detachably secured, as indicated at 101, to the squared end of the shaft. A keeper 102, similar to 79, previously described, may be utilized to hold the shaft 98 against endwise movement in either of its positions.

It is often desirable to make a number of hysteresis groups of one and the same specimen of rubber. If these are superimposed, i. e., taken without shifting the chart, it is difficult to distinguish the piled up diagrams. And consequently, it is of advantage to be able to readily shift the record carrier so as to separate the hysteresis loops or diagrams. To space the loops apart, I preferably attach to the back of the record carrier, a plate 103 carrying a rotatable pinion 104 which is engaged with the rack formed on the bar 88. To resist rotation of the pinion 104, I provide a spring detent 105 which lightly engages its teeth in such a way as to permit the application of a light force to the record carrier 72 to cause the detent to be overcome and the board to be shifted up or down a distance equal to the pitch of the rack teeth (or a multiple thereof).

In the commercial form of testing machine of Figs. 7–10, inclusive, a great practical advantage of my closed hydraulic system is disclosed. This system enables me to use a strip suspension for the lever, which type of suspension as is well-known has far less friction than a knife edge. I am enabled to use a strip of steel or other metal to suspend the lever since there is practically no motion or movement of the latter in operation. The suspending strip may, therefore, be made of considerable stiffness without introducing an error in the measurements. Owing to the fact that the lever 57 is substantially stationary, I may also, without error, secure the bottom or shiftable end of the sylphon 1 to the lever, and thus obtain an organization whose vital part, the closed hydraulic system, need not be tampered with by an operator and which it would be difficult for him to get out of order. In other words, the organized machine is not delicate, being, as a matter of fact, almost foolproof. In this commercial form of testing machine, the force applied to the specimen is measured by the motion of the free end 12 of the gage 8, the motion thereof being exactly proportional to the force applied to the specimen. That is to say, if a force of 5 lbs. deflects the pointer X inches, forces of 10, 15, 20 lbs., etc., will deflect the pointer 2X, 3X, 4X inches, respectively. The force applied to the specimen resides primarily in the coil tube 8 which is highly resistant to deformation. But there is some elastic resistance to the force applied to the specimen in the elastic container or sylphon 1 and in the elastic strip suspension 55. It is a valuable feature of the present invention that all the elastic reactions to the applied force may be divided in any proportion between the longitudinally bent tube 8, the elastic container or sylphon 1 and the resilient strip suspension 55, and that they may be of any convenient amount. In every case known, the deflection is directly proportional to the force applied to the specimen because well within the elastic limits of the materials.

The adjustability of the lever 57 in the commercial form of machine illustrated in Figs. 7–10, inclusive, permits of testing specimens in parallel, as diagrammatically illustrated in Fig. 3. For this purpose, the strip suspension 55 is moved to a position in line with the pull-rack 75 and a second jaw is attached to the strip or connector at the left end of the lever 57. A T-bar, not shown, is then attached to the lower jaw 66' and two specimens mounted in place as diagrammatically illustrated in Fig. 3.

The commercial testing machine not only permits testing in parallel, but generally, stress and strain records, hysteresis loops and breaks may be conveniently and quickly made and recorded with any kind of stock and with any degree of stretch.

Other features of the commercial form of testing machine illustrated are that manual as well as power operation is provided for in the two lines of transmission or trains of connections for reciprocating the rack-bar 75. The hand operation may be performed very rapidly and thereby adiabatic tests promptly obtained. The adjustability of the head of the machine, particularly of the sylphon 1 and suspension strip 55, as well as the slides on the lever 57, permit of arranging the apparatus for testing any kind of stock and, therefore, of determining the characteristics of specimens over a wide range of resistance. It is also to be noted that the closed hydraulic system 1—14—8 may be readily replaced by another of greater or lesser strength, as the need may be, to convert the machine over for testing entirely different materials, it being obviously immaterial in the operation of the machine what degree of stress is applied to a specimen so long as it does not exceed the strength of the materials transmitting the force applied to the closed hydraulic system.

While no difficulty has been encountered in setting the indicator 13 to a zero position, this may be accomplished, if desired, in a variety of ways as, for instance, by adjusting a weight (not shown) more or less away from the fulcrum of the lever 57 or by adjusting a spring (not shown) opposing movement of the lever 57. The paper on the record carrier may also be shifted a little to obtain a convenient zero position. By local constriction of the conduit 14, the pointer 13 may be dampened. The closed hydraulic system is practically unaffected by changes in temperature as the sylphon 1 takes up any change in the volume of the system without any appreciable movement of the indicator 13.

In the foregoing I have endeavored to set forth fully the principles underlying my invention and to show not only its scope by illustrations of various applications thereof but also its practical advantages by a disclosure of a specific commercial form of testing machine. The invention has great commercial advantages some of which have been pointed out and others of which will be apparent to those skilled in the art. All advantages inherent in the system are comprehended however and all changes in details of construction not departing from the underlying principles of the invention are intended to be included within the annexed claims to which reference is made. It will be obvious, for instance, that the form of the elements constituting the closed hydraulic system may be widely varied and that a resistance external of the system may be employed, if desired, although deemed less preferable than that which inheres in the system, particularly the wall structure of the coiled tube 8 or its equivalent.

Having thus described my invention, what I claim and desire to protect by Letters Patent is:

1. A closed elastic frictionless hydraulic system for determining forces applied in testing machines through pressure produced by the forces in the system including in combination, a unitary container with longitudinally collapsible peripherally inextensible side walls and freely shiftable substantially rigid end walls, a curved elastic tubular member having an anchored portion and an extremity movable in direct proportion to the change of pressure within the system, and a conduit establishing communication between the container and the curved tubular member, the liquid filling the conduit being substantially immovable throughout the range of operation of the system.

2. A closed elastic frictionless hydraulic system for testing machines including in combination, a unitary container with rigid end walls and peripherally inextensible side walls of a freely collapsible formation substantially non-resistant to change in its volumetric capacity, an elastic device highly resistant to change in its volumetric capacity, and a non-expansible conduit connecting the container and device, the liquid filling the conduit being substantially immovable throughout the range of operation of the system.

3. A closed elastic frictionless hydraulic system for testing machines including in combination, a unitary container with rigid end walls and peripherally inextensible side walls of a freely collapsible formation substantially non-resistant to change in its volumetric capacity, an elastic hollow device highly resistant to volumetric change, said device having a portion immovably anchored and another portion free to move with variations of pressure within the hydraulic system, and a non-expansible conduit connecting the container and hollow device, the liquid filling the conduit being substantially immovable throughout the range of operation of the system.

4. A closed elastic frictionless hydraulic system for testing machines including in combination, a unitary container with rigid end walls and peripherally inextensible side walls of a freely collapsible formation substantially non-resistant to volumetric change, an elastic hollow device highly resistant to volumetric change, said device having an extremity free to move with variations in pressure within the hydraulic system and self-restorative when the external pressure does not strain the material of the device beyond its elastic limit, and a non-expansible conduit connecting the container and device, the liquid filling the conduit being substantially immovable throughout the range of operation of the system.

5. A closed elastic frictionless hydraulic system for testing machines including in combination, a unitary container with rigid end walls and peripherally inextensible side walls of a freely collapsible formation non-resistant to volumetric change by forces applied externally thereto in one direction, a longitudinally bent elastic tube highly resistant to volumetric change, said tube being anchored at one point and free to move at another, the free portion of said tube being movable in direct proportion to changes of pressure within the elastic limit of the material of the tube, and a substantially non-distensible conduit connecting the container and the longitudinally bent tube, the liquid filling the conduit being substantially immovable throughout the range of operation of the system.

6. The combination with an abutment to which forces may be applied and an indicating member of, an intermediate hydraulic motion multiplying system comprising a unitary container laterally non-expansible and without error-producing frictional resistance, an elastic device highly resistant to increase in its volumetric capacity and having a portion free to move with changes in the pressure within the system, a non-expansible conduit connecting the container and device, said container being rigidly connected with said abutment, and the free portion of said device being directly connected with said indicating member, the liquid filling the conduit being substantially immovable throughout the range of operation of the system.

7. The combination with an abutment to which forces may be applied and an indicating member of, a unitary container with collapsible but inextensible side walls, a curled tube adapted to be anchored at one end and free to move at the other, a non-expansible conduit connecting the container and the curled tube, said container being rigidly connected with said abutment and the free end of the curved tube being directly connected with the indicating member, the liquid filling the conduit being substantially immovable throughout the range of operation of the system.

8. A closed elastic frictionless hydraulic system for testing machines including in combination, a unitary container with rigid end walls and collapsible peripherally inextensible side walls hermetically connected together, a longitudinally bent tube having a freely movable extremity, a non-expanding conduit connecting the container and tube, said container, conduit and tube constituting a closed system in operation obeying Hooke's law, the liquid filling the conduit being substantially immovable throughout the range of operation of the system.

9. A closed elastic frictionless hydraulic system for testing machines including in combination, a unitary container with rigid end walls and collapsible peripherally inextensible side walls hermetically connected together, a device highly resistant to volumetric change and having a portion movable substantially and appreciably when the volumetric change is minute and inappreciable, and a conduit connecting said container and device, the liquid filling the conduit being substantially immovable throughout the range of operation of the system.

10. A closed elastic frictionless hydraulic system for testing machines including in combination, a unitary container with rigid end walls and collapsible peripherally inextensible side walls hermetically connected together, a hollow motion-multiplying-device highly resistant to increase in its volume and having a portion or wall movable to a substantial extent with variations in pressure within the system, and a conduit connecting said container and device, the liquid filling the conduit being substantially immovable throughout the range of operation of the system.

11. A closed elastic frictionless hydraulic system for testing machines including in combination, a unitary container with rigid end walls and collapsible peripherally inextensible side walls hermetically connected together, a hollow elastic device with a movable end or wall portion and constructed to offer a high resistance to increase in its volume, and a conduit connecting the container and hollow device, the volume of the system thereby constituted being substantially constant in operation, the liquid filling the conduit being substantially immovable throughout the range of operation of the system.

12. A closed elastic frictionless hydraulic system including a unitary container with rigid end walls and collapsible peripherally inextensible side walls hermetically connected together, a hollow device with an end wall movable by variation in pressure therewithin, a conduit connecting said container and hollow device, in combination with a frame, a lever, and means for stressing the specimen and through it pulling upon the lever, said container being collapsibly confined between said frame and said lever, the liquid filling the conduit being substantially immovable throughout the range of operation of the system.

13. A closed elastic frictionless hydraulic system including a unitary container with rigid end walls and collapsible peripherally inextensible side walls hermetically connected together, a hollow device with an end wall movable by variation in pressure therewithin, a conduit connecting said container and hollow device, in combination with, a frame, a lever, and means for stressing the specimen and through it pulling upon the lever, said container being collapsibly and adjustably confined between said frame and said lever.

14. A closed elastic frictionless hydraulic system including a unitary container with rigid end walls and collapsible peripherally inextensible side walls hermetically connected together, a hollow device with an end wall movable by variation in pressure therewithin, a conduit connecting said container and hollow device, in combination with, a frame, a lever, a strip suspension for said lever, and means for stressing the specimen and through it pulling upon the lever, said container being collapsibly confined between said frame and said lever.

15. A closed elastic frictionless hydraulic system including a unitary container with rigid end walls and collapsible peripherally inextensible side walls hermetically connected together, a hollow device with an end wall movable by variation in pressure therewithin, a conduit connecting said container and hollow device, in combination with, a frame, a lever, a strip suspension for said lever, and means for stressing the specimen and through it pulling upon the lever, said container being collapsibly confined between said frame and said lever, and said strip suspension and said container being adjustable relative the frame.

16. A closed elastic frictionless hydraulic system including a unitary container with rigid end walls and collapsible peripherally inextensible side walls hermetically connected together, a hollow device with an end wall movable by variation in pressure therewithin, a conduit connecting said container and hollow device, in combination with, a frame, a lever, a strip suspension for said lever, and means for stressing the specimen and through it pulling upon the lever, said container being collapsibly confined between said frame and said lever, and said strip suspension and said container being adjustably connected to said lever whereby to permit variation in the leverage arms thereof.

17. A closed elastic frictionless hydraulic system including a unitary container with rigid end walls and collapsible peripherally inextensible side walls hermetically connected together, a hollow device with an end wall movable by variation in pressure therewithin, a conduit connecting said container and hollow device, in combination with, a frame, a lever, and means for stressing the specimen and through it pulling upon the lever, said container being collapsibly confined between said frame and said lever, said last named means including connections permitting the specimen to be stressed selectively either mechanically or manually.

18. A closed elastic frictionless hydraulic system including a unitary container with rigid end walls and collapsible peripherally inextensible side walls hermetically connected together, a hollow device with an end wall movable by variation in pressure therewithin, a conduit connecting said container and hollow device, in combination with, a frame, a lever, and means for stressing the specimen and through it pulling upon the lever, said container being collapsibly confined between said frame and said lever, said closed hydraulic system being demountable and replaceable by another of different capacity without substantial change in the relation between the lever and the frame, the liquid filling the conduit being substantially immovable throughout the range of operation of the system.

19. A closed elastic frictionless hydraulic system including a unitary container with rigid end walls and collapsible peripherally inextensible side walls hermetically connected together, a hollw device with an end wall movable by variation in pressure therewithin, a conduit connecting said container and hollow device, in combination with a frame, a lever, and means for stressing the specimen and through it pulling upon the lever, said container being collapsibly confined between said frame and said lever, and a record carrier movable in proportion to and simultaneously with the means for stressing a specimen, the liquid filling the conduit being substantially immovable throughout the range of operation of the system.

20. A closed elastic frictionless hydraulic system including a unitary container with rigid end walls and collapsible peripherally inextensible side walls hermetically connected together, a hollow device with an end wall movable by variation in pressure therewithin, a conduit connecting said container and hollow device, in combination with, a frame, a lever, and means for stressing the specimen and through it pulling upon the lever, said container being collapsibly confined between said frame and said lever, and connections between the record carrier and the means for stressing the specimen permitting the former to be moved in various predetermined proportions relative to one end 21. In a testing machine, a closed elastic frictionless hydraulic system comprising a unitary container with rigid end walls and collapsible peripherally inextensible side walls, a longitudinally bent hollow tube, a conduit connecting the container and tube, said conduit, container and tube being filled with liquid, in combination with a lever operatively associated with the collapsible container, means for connecting a specimen of material with said lever, means for stressing the specimen of material by engagement of the other end thereof, and means for simultaneously recording stresses and deformation of the specimen, the liquid filling the conduit being substantially immovable throughout the range of operation of the system.

22. In a testing machine, a closed elastic frictionless hydraulic system comprising a unitary container with rigid end walls and collapsible peripherally inextensible side walls, a longitudinally bent hollow tube, a conduit connecting the container and tube, said conduit, container and tube being filled with liquid, in combination with a lever operatively associated with the collapsible container, means for connecting a specimen of material with said lever, means for stressing the specimen of material by engagement of the other end thereof, and means for simultaneously recording stresses and deformations of the specimen, said lever being suspended by a strip of resilient material, the liquid filling the conduit being substantially immovable throughout the range of operation of the system.

Signed at New York, county of New York, and State of New York, this 31st day of August, 1922.

JOSEPH G. COFFIN.